United States Patent

Bruder

[15] 3,691,541

[45] Sept. 12, 1972

[54] READ ONLY MEMORY

[72] Inventor: John F. Bruder, Phoenix, Ariz.

[73] Assignee: Quadri Corporation

[22] Filed: Jan. 25, 1971

[21] Appl. No.: 109,340

[52] U.S. Cl.......340/174 SP, 340/174 S, 340/174 QB

[51] Int. Cl. ..............................................G11c 17/00

[58] Field of Search.......340/174 SP, 174 S, 174 QB, 340/174 AC

[56] References Cited

UNITED STATES PATENTS

| | | | |
|---|---|---|---|
| 3,215,992 | 11/1965 | Schallerer | 340/174 AC |
| 3,396,373 | 8/1968 | Didic | 340/174 AC |
| 3,488,641 | 1/1970 | Faulkner et al. | 340/174 AC |
| 3,535,690 | 10/1970 | Reimer | 340/174 SP |
| 3,461,439 | 8/1969 | Kelly et al. | 340/174 SP |
| 3,496,556 | 2/1970 | Wennstrom | 340/174 SP |
| 3,175,200 | 3/1965 | Hoffman et al. | 340/174 S |
| 3,295,110 | 12/1966 | Brick et al. | 340/174 SP |

OTHER PUBLICATIONS

IBM Technical Disclosure Bulletin "Memory Core Selection System" by Leightner, vol. 5, no. 7, 12/62, p. 61, 62.

*Primary Examiner*—Stanley M. Urynowicz, Jr.
*Attorney*—William C. Cahill and Samuel J. Sutton, Jr.

[57] ABSTRACT

A read only memory is provided utilizing a plurality of storage cells, each including a cylindrical slug of ferrite material having a read winding thereon: address lines pass between the storage cells and inductively couple the slugs in either a predetermined sense or an opposite sense. An electrostatic shield is provided and a bias winding is inductively coupled to each of the slugs to facilitate error-free reading of the memory contents.

3 Claims, 4 Drawing Figures

INVENTOR.
JOHN F. BRUDER
BY
Cahill Sutton & Thomas
ATTORNEYS

READ ONLY MEMORY

The present invention pertains to memories, and more particularly, to read only memories.

Enumerable requirements have arisen for the utilization of a fixed store of information which can be accessed at predetermined addresses. Typically, this fixed store or read only memory has utilized storage cells that are arranged to be accessed by address lines, each cell having a read winding to provide an output signal when the cell is addressed. Semiconductive devices as well as core devices have been used; however, in a typical application, the read only memory will be "wired" to contain predetermined fixed information. Frequently, this "fixed" information must be changed to comport with the requirements of a specific environment. In certain types of read only memories, the alteration of the informational content of the memory is impossible after manufacture. In core-type read only memories, the informational content can sometimes be changed through the utilization of a very time-consuming and difficult restringing technique adding address lines to provide proper information content for the new requirement.

The cost per stored bit is also a significant factor which, of course, is determined by the capacity of a system with *n* storage cells to store *n* times *m* words. Limitations imposed by the signal-to-noise ratio in the memory will limit the size of the memory required to store a given amount of information; thus, a high signal-to-noise ratio will enable the construction of a memory with a larger number of storage cells without a corresponding increase in the apparatus required to address the information in the memory. Another factor in the economics of read only memories is the complexity of the apparatus required for winding the cores and the rapidity with which the cores can be wound.

It is therefore an object of the present invention to provide a read only memory having a high signal-to-noise ratio.

It is also an object of the present invention to provide a read only memory in which the informational content may readily be altered after the construction of the memory.

It is still another object of the present invention to provide a read only memory that is readily adapted to rapid and automatic winding.

It is still another object of the present invention to provide a read only memory having a low cost per bit that nevertheless may be altered in the field without special facilities.

These and other objects of the present invention will become apparent to those skilled in the art as the description thereof proceeds.

The present invention may be described by reference to the accompanying drawings, in which.

Figure 1:
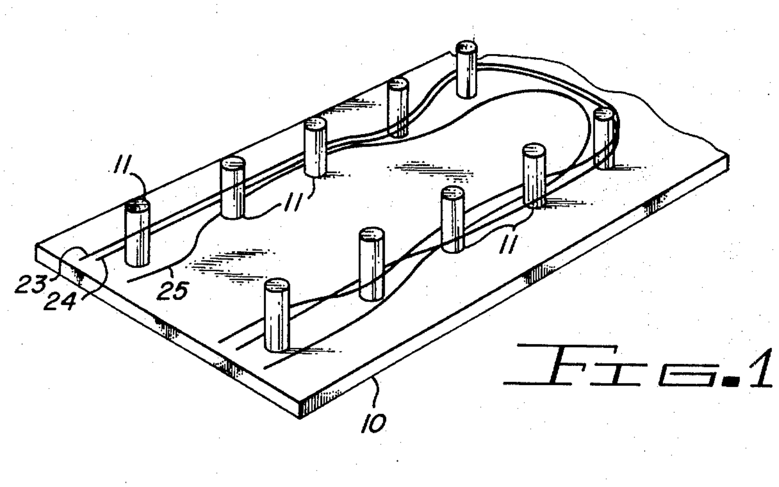
FIG. 1 is a perspective view of a typical embodiment of the present invention showing a circuit board having a read only memory mounted thereon utilizing cylindrical slugs in accordance with the teachings of the present invention.
Figure 2:
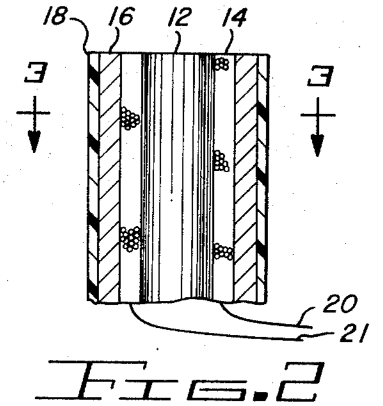
FIG. 2 is a cross-sectional view of one of the storage cells of FIG. 1.
Figure 3:
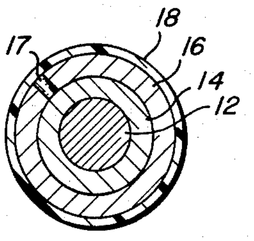
FIG. 3 is a cross-sectional view of FIG. 2, taken along line 3—3.

Referring now to FIG. 1, a printed circuit board 10 includes a plurality of circuit components secured thereto such as may be necessary to implement addressing and switching of a read only memory. The read only memory includes a plurality of storage cells 11, each extending from the circuit board 10 which acts as a supporting surface for the storage cells. Referring to FIGS. 2 and 3, each of the storage cells includes a cylindrical ferrite slug 12; the ferrite material utilized in the storage cells exhibits linear magnetic characteristics similar to transformer core material and is not the type of ferrite material used in random access memories (the latter type incorporating a square loop characteristic).

A winding 14 is provided about each of the slugs 12 and operate as a read winding of multiple turns for the detection of the rate of change of flux in the core. An electrostatic shield 16 is mounted over the respective windings and may be formed of any non-magnetic conducting material, such as an aluminum foil. It also may be noted that the shield incorporates an insulating gap 17 which prevents the shield from becoming a short-circuited winding on the slug. The cell 11 may be encased in an insulating wrapper 18 and secured to the board 10 in any convenient manner. Conductors 20 and 21 extend from the read winding 14 and may be applied to read circuitry (not shown in FIGS. 2 and 3).

The embodiment shown in FIG. 1 includes only a few storage cells 11 to simplify the explanation of the present invention. As exemplary of the address and bias windings provided in the embodiment of FIG. 1, the windings are shown as conductors 23, 24, and 25. It may be seen that the conductors inductively couple each of the storage cells but the coupling is in a predetermined sense in some instances and in an opposite sense in other instances. The conductors form a "harness" which may readily be preformed using presently available wire and harness-forming machines. The harness may be formed, for example, on pegs corresponding in size and spacing to the slugs 11 and then may readily be slipped off the pegs onto the slugs to form the present memory. Alteration of the informational content of the memory is readily achieved by simply adding a conductor to the memory; this latter operation may be accomplished by hand in the field, it being necessary only to string the conductor on one side or the other of each of the slugs, depending on whether the inductive coupling to the slugs is to be in a predetermined sense or an opposite sense.

Figure 4:
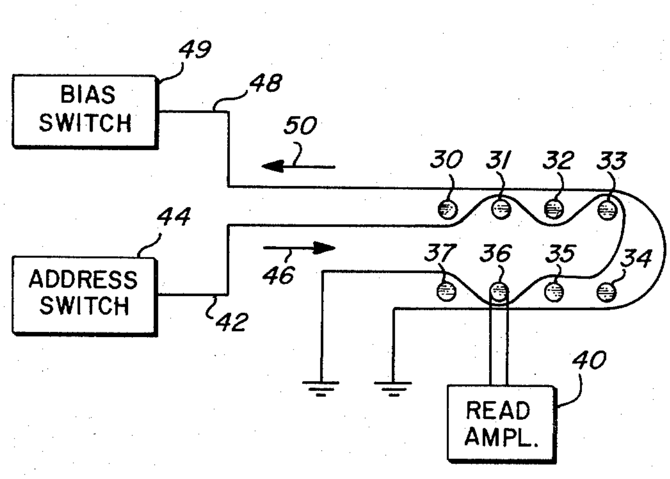
FIG. 4 is a schematic illustration of a portion of a read only memory useful in describing the operation of the memory of the present invention.

A schematic representation of an embodiment of the present invention is shown in FIG. 4. The slugs 30–37 are each formed as described above. Further, each of the slugs 30–37 will include conductors extending therefrom and connecting to an appropriate read amplifier, such as the read amplifier 40 connected to the slug 36. A plurality of address lines are then wound about the slugs such as the address line 42. The address lines are connected to an address switching system 44 for applying an address signal to a selected address line. For purposes of explanation, it will be assumed that the current resulting from the application of a signal to address line 42 will be in the direction shown by the arrow 46. Although not always necessary, a bias line 48 is provided and is inductively coupled to all of the slugs in the memory and is coupled in a predetermined sense to each slug. The bias winding is provided with a biasing signal through a bias switch 49 which results in current flowing in the bias winding 48 in the direction indicated by the arrow 50. In the embodiment chosen for description in FIG. 4, it may be seen that the simultaneous application of an address signal to the address winding 42 and a bias signal to the bias winding 48 will result in currents of opposite polarity, the inductive effects of which tend to cancel one another as these currents pass and inductively couple slugs 31, 33, and 36; however, these same currents inductively couple and tend to reinforce each other in slugs 30, 32, 34, 35, and 37. The rate of change of flux thus induced in the latter slugs produces an output signal on the read windings of the corresponding slugs which may be amplified by their corresponding read amplifiers, such as amplifier 40. If we assume the convention that a detected rate of change represents a binary 1, then the information stored in the address corresponding to the address winding 42 is the binary word 1010110. Alternatively, the bias winding 48 may be eliminated with the result that upon application of an address signal to the address line 42, an output signal will be detected at each of the slugs 30–37. The polarity of the flux change in the respective slugs will depend on the sense in which the address winding 42 couples to the slugs. Therefore, instead of the existence or absence of a signal at each slug, a positive-going or negative-going signal will be derived from the slug, depending on the sense of the coupling to the address line. The signal-to-noise ratio is very high since each address winding is a fractional turn winding, thus generating very low parasitic signals. Since the low parasitic signals resulting from the loose coupling between the address winding and cores yields a high signal-to-noise ratio, the number of slugs or cores per address winding may significantly be increased, thus permitting a larger memory for a given address selection arrangement.

The cores or slugs in the embodiment chosen for illustration are cylindrical; however, any substantially straight bar of ferrite material having other cross sections may be tolerated without seriously affecting performance.

It will therefore be obvious to those skilled in the art that many modifications may be made in the embodiment chosen for illustration without departing from the spirit of the invention.

I claim:

1. In a read only memory, the combination comprising:

a. a plurality of storage cells, each said cell being a straight bar of ferrite material, having a predetermined number of address lines coupled thereto, each address line inductively coupled to each storage cell through a fractional turn address winding in a predetermined sense to selected ones of said storage cells while inductively coupled in an opposite sense to all other storage cells in accordance with the information stored in said address line;

b. a bias winding inductively coupled in said predetermined sense to all of said storage cells and bias switching means for applying a biasing signal to said bias winding, said bias signal coupled to all of said storage cells to reinforce signals applied by said address lines to said selected ones of said storage cells and to oppose signals applied by said address lines to all other storage cells;

c. each storage cell having a multiple turn output winding responsive to a signal on one of said predetermined number of address lines for coupling said signal to said output winding; and d. switching means connected to said address lines for selecting an address line and applying a signal thereto.

2. The combination set forth in claim 1, wherein said substantially straight bar of ferrite material is a cylindrical slug.

3. The combination set forth in claim 2, including an electrostatic shield comprising a non-magnetic conducting material extending around said output winding; said shield insulated from said winding and having an insulating gap therein to prevent said shield from becoming a winding.

* * * * *